US012691813B2

(12) United States Patent
 Tanaka

(10) Patent No.: US 12,691,813 B2
(45) Date of Patent: Jul. 28, 2026

(54) VEHICLE LAMP WITH LAMP CONTROLLER THAT CONTROLS THE EMISSION DIRECTION WHEN TURNING

(71) Applicant: KOITO MANUFACTURING CO., LTD., Tokyo (JP)

(72) Inventor: Hidetada Tanaka, Shizuoka (JP)

(73) Assignee: KOIT MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 19/096,753

(22) Filed: Apr. 1, 2025

(65) Prior Publication Data

US 2025/0229699 A1    Jul. 17, 2025

Related U.S. Application Data

(63) Continuation of application No. PCT/JP2023/036189, filed on Oct. 4, 2023.

(30) Foreign Application Priority Data

Oct. 7, 2022    (JP) ................................. 2022-162487

(51) Int. Cl.
 *B60Q 1/00*      (2006.01)
 *B60Q 1/076*     (2006.01)
 *B60Q 1/12*      (2006.01)
 *F21S 41/657*    (2018.01)
 *F21W 102/155*   (2018.01)

(52) U.S. Cl.
 CPC ............. *B60Q 1/122* (2013.01); *B60Q 1/076* (2013.01); *F21S 41/657* (2018.01); *B60Q 2300/112* (2013.01); *B60Q 2300/122* (2013.01); *B60Q 2300/42* (2013.01); *F21W 2102/155* (2018.01)

(58) Field of Classification Search
 CPC .......... B60Q 1/12; B60Q 1/121; B60Q 1/122; B60Q 1/124; B60Q 2300/42; B60Q 2300/112; B60Q 2300/122; B60Q 1/076; F21S 41/657
 See application file for complete search history.

(56) References Cited

U.S. PATENT DOCUMENTS

2003/0039124 A1*  2/2003  Tawa ....................... B60Q 1/10
                                                    362/531
2015/0251586 A1    9/2015  Imaeda et al.

FOREIGN PATENT DOCUMENTS

| | | |
|---|---|---|
| DE | 102008060949 A1 | 9/2009 |
| JP | H05-085257 A | 4/1993 |
| JP | 2003-054312 A | 2/2003 |
| JP | 2004-050988 A | 2/2004 |
| JP | 2006-273092 A | 10/2006 |

(Continued)

OTHER PUBLICATIONS

International Search Report issued on Nov. 28, 2023 for WO 2024/075769 A1 (6 pages).

*Primary Examiner* — Robert J May
(74) *Attorney, Agent, or Firm* — LICA, Inc.

(57) ABSTRACT

A vehicle lamp includes an optical unit including a light source that emits at least a low beam light distribution pattern and a lamp control unit that controls the optical unit. When the vehicle is turning and an oncoming vehicle is present in front of a vehicle mounted with the vehicle lamp, the lamp control unit controls the optical unit to lower an emission direction of the low beam light distribution pattern.

8 Claims, 10 Drawing Sheets

(56) References Cited

FOREIGN PATENT DOCUMENTS

| JP | 2011-016505 A | 1/2011 |
| JP | 2014-051191 A | 3/2014 |

* cited by examiner

VEHICLE LAMP WITH LAMP CONTROLLER THAT CONTROLS THE EMISSION DIRECTION WHEN TURNING

CROSS REFERENCE TO RELATED APPLICATIONS

This application is a continuation application of International Patent Application No. PCT/JP2023/036189, filed on Oct. 4, 2023, which claims priority from Japanese Patent Application No. 2022-162487, filed on Oct. 7, 2022, with the Japan Patent Office, the disclosures of which are incorporated herein in their entireties by reference.

TECHNICAL FIELD

The present disclosure relates to a vehicle lamp.

BACKGROUND

Japanese Patent Laid-Open Publication No. 2014-051191 discloses a vehicle headlamp device that prohibits light emission based on a high beam light distribution pattern when the turning radius of a host vehicle while traveling is smaller than a predetermined value, in order to emit light over a wide area without causing glare to the driver of a preceding vehicle.

SUMMARY

In a low beam light distribution pattern emitted by a vehicle lamp, the cutoff line of light primarily emitted to the opposing lane is lower than the cutoff line of light primarily emitted to the vehicle own lane. Thus, when a vehicle is traveling straight, glare to the occupant of an oncoming vehicle traveling in the opposing lane is suppressed, and light is emitted over a wide range of the vehicle own lane, making it easier to detect pedestrians and other obstacles. However, when the vehicle is turning, the light emitted to the vehicle own lane may also be directed to the opposing lane. In such a case, the light emitted to the vehicle own lane may cause glare to the occupant of the oncoming vehicle.

The present disclosure aims to provide a vehicle lamp that further reduces glare to the occupant of an oncoming vehicle when a vehicle is turning.

According to an aspect of the present disclosure, a vehicle lamp includes an optical unit including a light source that emits at least a low beam light distribution pattern and a lamp control unit that controls the optical unit, in which when a vehicle mounted with the vehicle lamp is turning and an oncoming vehicle is present in front of the vehicle, the lamp control unit controls the optical unit to lower an emission direction of the low beam light distribution pattern.

According to the vehicle lamp of the present disclosure, when the vehicle is turning and an oncoming vehicle is present, the emission direction of the low beam light distribution pattern is lowered, and the cutoff line of the low beam light distribution pattern is uniformly lowered. Therefore, even when the light emitted to the vehicle own lane may also be directed to the opposing lane, the uniformly lowered cutoff line may further reduce glare to the occupant of the oncoming vehicle.

According to the present disclosure, it is possible to provide a vehicle lamp that further reduces glare to the occupant of an oncoming vehicle when a vehicle is turning.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
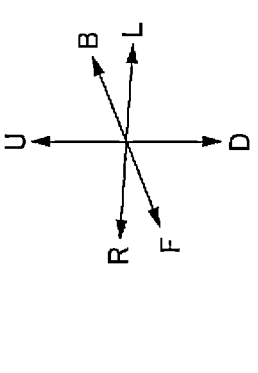
FIG. 1 is a perspective view of a vehicle equipped with a vehicle lamp according to an embodiment of the present disclosure (hereinafter, simply referred to as the "present embodiment").
Figure 1:
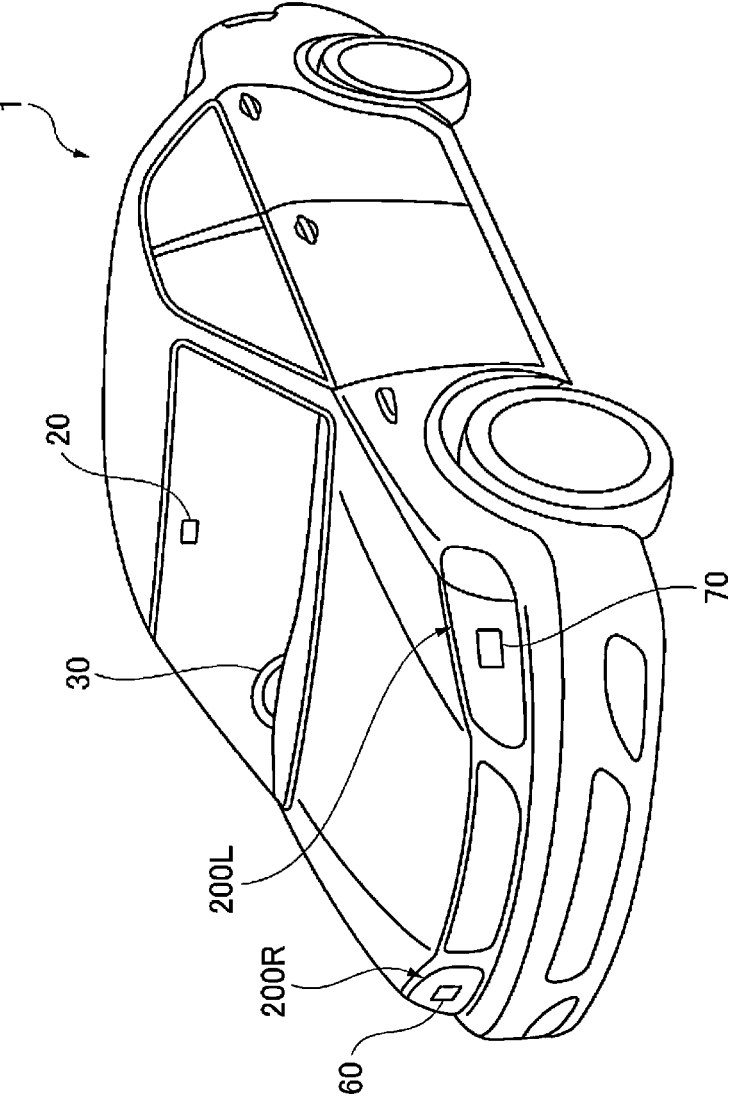

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, the present embodiment will be described with reference to the drawings. The dimensions of each member illustrated in these drawings may differ from the actual dimensions of each member for the convenience of description.

Further, in the description of the present embodiment, terms "left-right direction," "up-down direction (vertical direction)," and "front-back direction" may be appropriately mentioned for the convenience of description. These directions are relative directions set for a vehicle 1 illustrated in FIG. 1. Here, the "left-right direction" includes both the "leftward direction" and the "rightward direction" and also refers to the width direction of the vehicle 1. The "up-down direction" includes both the "upward direction" and the "downward direction." The "front-back direction" includes both the "forward direction" and the "backward direction." The front-back direction is perpendicular to both the left-right direction and the up-down direction. In each drawing, the reference character U indicates the upward direction. The reference character D indicates the downward direction. The reference character F indicates the forward direction. The reference character B indicates the backward direction.

The reference character L indicates the leftward direction. The reference character R indicates the rightward direction.

First Embodiment

Figure 2:
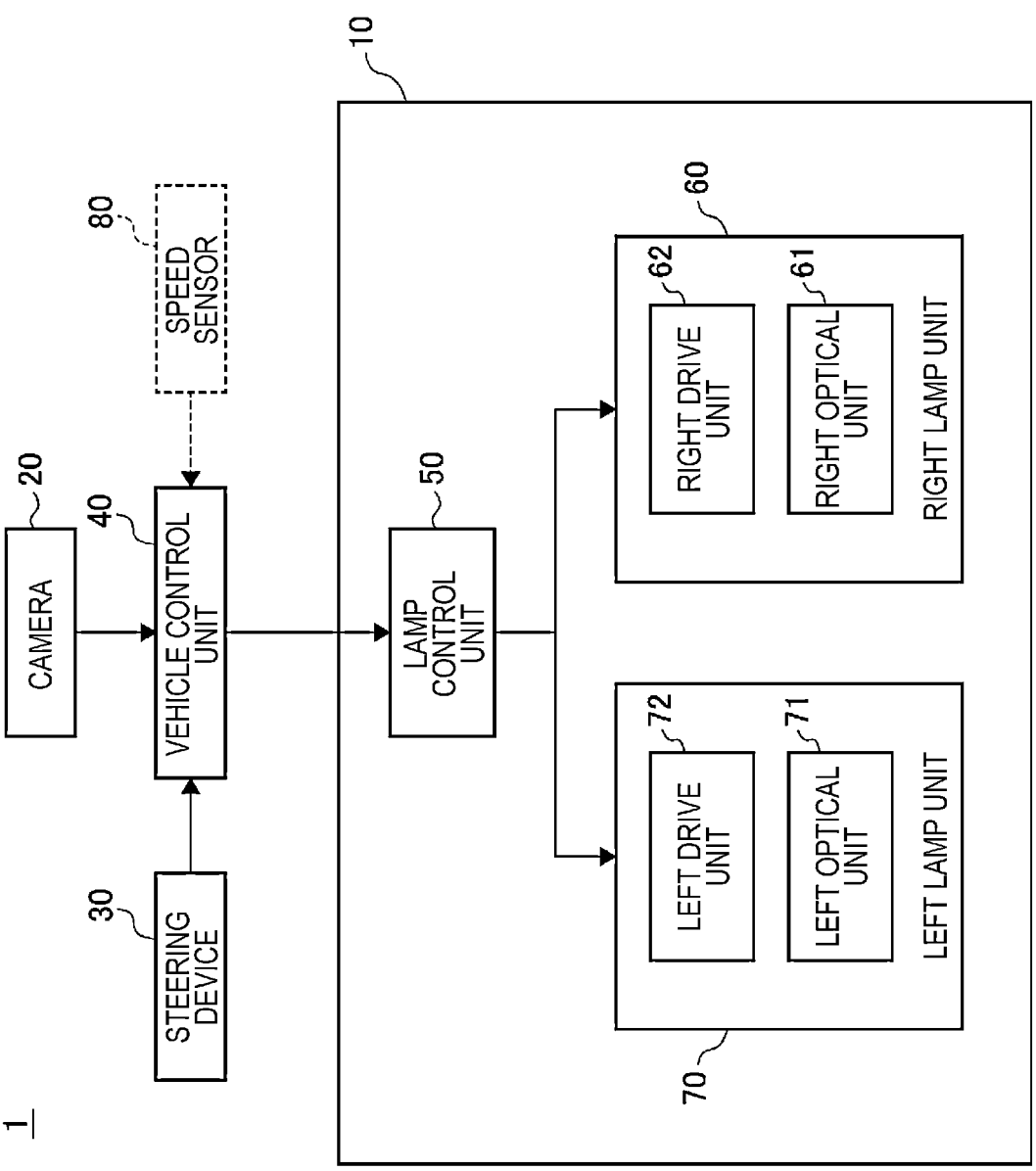
FIG. 2 is a block diagram of a system configuration including the vehicle lamp according to the present embodiment.

First, a vehicle lamp 10 according to the present embodiment will be described below with reference to FIGS. 1 and 2. FIG. 1 is a perspective view of the vehicle 1 equipped with the vehicle lamp 10. FIG. 2 is a block diagram of a system configuration including the vehicle lamp 10. The vehicle 1 is, for example, a vehicle (automobile) capable of traveling in a manual driving mode and/or an automatic driving mode.

As illustrated in FIGS. 1 and 2, the vehicle 1 includes the vehicle lamp 10, a camera 20, a steering device 30, and a vehicle control unit 40. As illustrated in FIGS. 1 and 2, the vehicle lamp 10 includes a lamp control unit 50, a right lamp unit 60 located on the right side of the vehicle 1, and a left lamp unit 70 located on the left side of the vehicle 1. As illustrated in FIG. 1, the right lamp unit 60 is arranged inside a lamp chamber of a right headlamp 200R. The left lamp unit 70 is arranged inside a lamp chamber of a left headlamp 200L. The right lamp unit 60 may also be provided separately from the right headlamp 200R. The left lamp unit 70 may also be provided separately from the left headlamp 200L. The camera 20 is positioned, for example, near a front windshield. The camera 20 is positioned between the right lamp unit 60 and the left lamp unit 70 in the vehicle width direction (left-right direction in FIG. 1) of the vehicle 1. The steering device 30 is, for example, provided in the interior of the vehicle 1.

The right lamp unit 60 includes a lamp body (not illustrated), an outer cover (not illustrated), a right optical unit 61 arranged inside the lamp chamber formed by the lamp body and the outer cover, and a right drive unit 62 arranged inside the lamp chamber. The left lamp unit 70 includes a lamp body (not illustrated), an outer cover (not illustrated), a left optical unit 71 arranged inside the lamp chamber formed by the lamp body and the outer cover, and a left drive unit 72 arranged inside the lamp chamber.

The camera 20 includes, for example, an imaging device such as a charge-coupled device (CCD) or complementary MOS (CMOS). The camera 20 acquires imaging data by capturing images of the surroundings of the vehicle 1 (e.g., an area in front of the vehicle 1). The camera 20 outputs the imaging data to the vehicle control unit 40.

The steering device 30 includes, for example, a steering wheel, a shaft, and a rack and pinion mechanism. When the steering wheel is rotated clockwise or counterclockwise, the steering device 30 transmits the rotation of the steering wheel to the rack and pinion mechanism through the shaft, thereby changing the direction of wheels to the left or right based on the rotation direction of the steering wheel. When the steering device 30 is operated to the right during the traveling of the vehicle 1, the vehicle 1 moves to the right. When the steering device 30 is operated to the left during the traveling of the vehicle 1, the vehicle 1 moves to the left.

The vehicle control unit 40 is configured to control the traveling of the vehicle 1. The vehicle control unit 40 may be configured to determine the surrounding environment of the vehicle 1 based on surrounding environment information and to transmit the determined results to the lamp control unit 50. The vehicle control unit 40 is constituted with, for example, at least one electronic control unit (ECU). The electronic control unit includes, for example, a computer system including one or more processors and one or more memories as well as an electronic circuit including active elements such as transistors and passive elements.

The vehicle control unit 40 is configured to analyze the imaging data output from the camera 20. The vehicle control unit 40 detects surrounding environment information indicating the surrounding environment of the vehicle 1 from the imaging data and transmits the detected surrounding environment information to the lamp control unit 50. The surrounding environment information includes, for example, position information for a target object (such as an oncoming vehicle, a preceding vehicle, or a traffic sign) located in front of the vehicle 1, and type information for the target object. The position information is, for example, an angular coordinate indicating the azimuth of the target object as seen from the vehicle 1. The vehicle control unit 40 may identify the type of the target object and generate type information by analyzing, for example, light emitted from or reflected by the target object. The vehicle control unit 40 may also identify the type of the target object and generate type information, for example, based on changes in the distance between the vehicle 1 and the target object. The vehicle control unit 40 may also identify the type of the target object and generate type information based on a combination of the analysis results of light emitted from or reflected by the target object and changes in the distance between the vehicle 1 and the target object.

The lamp control unit 50 may have the same hardware configuration as that of the vehicle control unit 40. The lamp control unit 50 is configured to control the right lamp unit 60 and the left lamp unit 70 based on the surrounding environment information received from the vehicle control unit 40.

The lamp control unit 50 stores first emission area information related to the emission area of the right optical unit 61 provided in the right lamp unit 60. The first emission area information indicates the area to which light is emitted from the right optical unit 61 when the vehicle 1 is traveling straight and no target object is present in front of the vehicle 1. In the present embodiment, the first emission direction of the right optical unit 61 when no target object is present in front of the vehicle 1 is referred to as the "first reference direction." Further, the lamp control unit 50 stores second emission area information related to the emission area of the left optical unit 71 provided in the left lamp unit 70. The second emission area information indicates the area to which light is emitted from the left optical unit 71 when the vehicle 1 is traveling straight and no target object is present in front of the vehicle 1. In the present embodiment, the second emission direction of the left optical unit 71 when no target object is present in front of the vehicle 1 is referred to as the "second reference direction."

In the present embodiment, the emission area of the right optical unit 61 and the emission area of the left optical unit 71 are the same. Therefore, the following description will focus on a case where the lamp control unit 50 controls the right lamp unit 60, and the description for controlling the left lamp unit 70 will be omitted.

The lamp control unit 50 is configured to displace the first emission direction of the right optical unit 61 by a first movement amount by driving the right drive unit 62. The lamp control unit 50 is configured to calculate the first movement amount of the first emission direction in the up-down direction based on the position information for the target object located in front of the vehicle 1 and the first emission area information. In the present embodiment, the lamp control unit 50 calculates, as the first movement amount, the angle by which the first emission direction is displaced from the first reference direction. In the present embodiment, the first reference direction is set to 0 degrees. This 0 degree reference direction may be aligned with the horizontal direction, or may be set to a predetermined reference angle different from the horizontal direction. For example, the first movement amount when the first emission direction is moved upward from the first reference direction is a positive value (angle). The first movement amount when the first emission direction is moved downward from the first reference direction is a negative value (angle). The absolute value of the first movement amount may be within the range of 0 degrees to 3 degrees. The first movement amount is an example of displacement amount.

The right optical unit 61 is configured to emit at least a low beam light distribution pattern. The right optical unit 61 includes, for example, a low beam lamp. The right optical unit 61 may also be configured to emit not only a low beam light distribution pattern but also an adaptive driving beam (ADB) light distribution pattern. In this case, the right optical unit 61 includes a low beam lamp and an ADB high beam lamp. The ADB high beam lamp emits an ADB light distribution pattern to an area including a higher position than the low beam light distribution pattern. The ADB light distribution pattern is a type of high beam light distribution pattern that does not emit light to areas where preceding vehicles or oncoming vehicles are present and that varies a non-emission area based on the presence or absence and positions of preceding vehicles or oncoming vehicles. The right optical unit 61 includes, for example, at least one light source and a projection lens for projecting light emitted from the light source to a forward area of the vehicle 1. The light source 71 may be constituted with, for example, light emitting diodes (LEDs) or laser diodes (LDs). When the right optical unit 61 includes an ADB high beam lamp, the light source may be constituted with, for example, micro LEDs. The projection lens 73 is, for example, an aspherical lens with a convex front surface and a flat rear surface. The projection lens 73 is made of a light transmitting material, for example, a transparent resin such as acryl.

The right optical unit 61 may be constituted with, for example, at least one light source, a drive mirror, and an optical system including a lens, a mirror, and similar components. The drive mirror may be configured with a digital mirror device (DMD) such as a micro electro mechanical system (MEMS) mirror, or a rotating blade mirror.

The right drive unit 62 is, for example, a leveling actuator. The right drive unit 62 includes, for example, a motor serving as a drive source and a screw that rotates when the motor is driven. The screw included in the right drive unit 62 is, for example, screwed into the right optical unit 61. When the right drive unit 62 operates, the right optical unit 61 tilts in the up-down direction. As such, the right drive unit 62 may displace the orientation of the right optical unit 61 in the up-down direction.

The configuration of the left lamp unit 70 is the same as that of the right lamp unit 60, and thus, will not be described.

First Example

Figure 3:
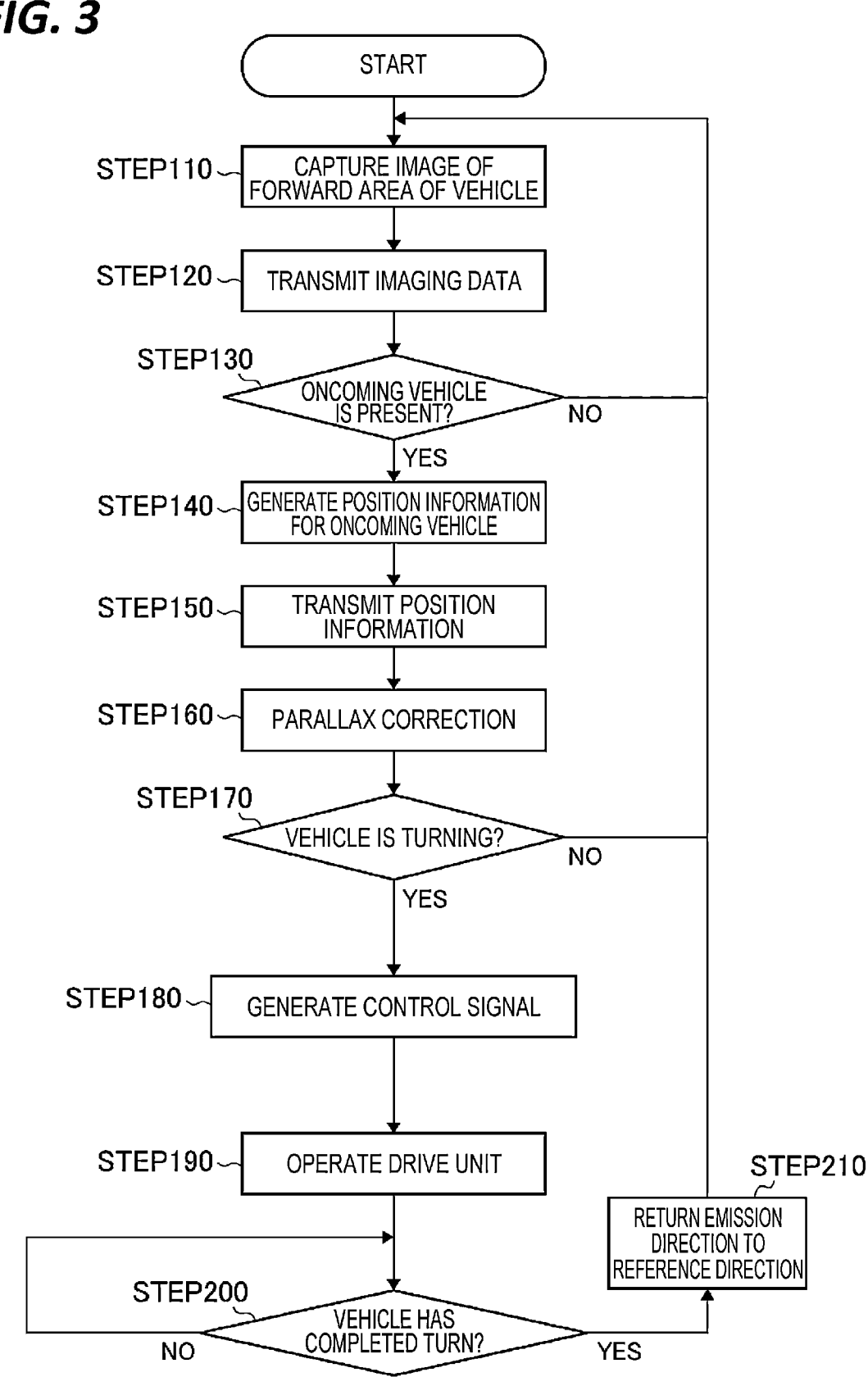
FIG. 3 is a flowchart illustrating a first example performed in the present embodiment.
Figure 4:
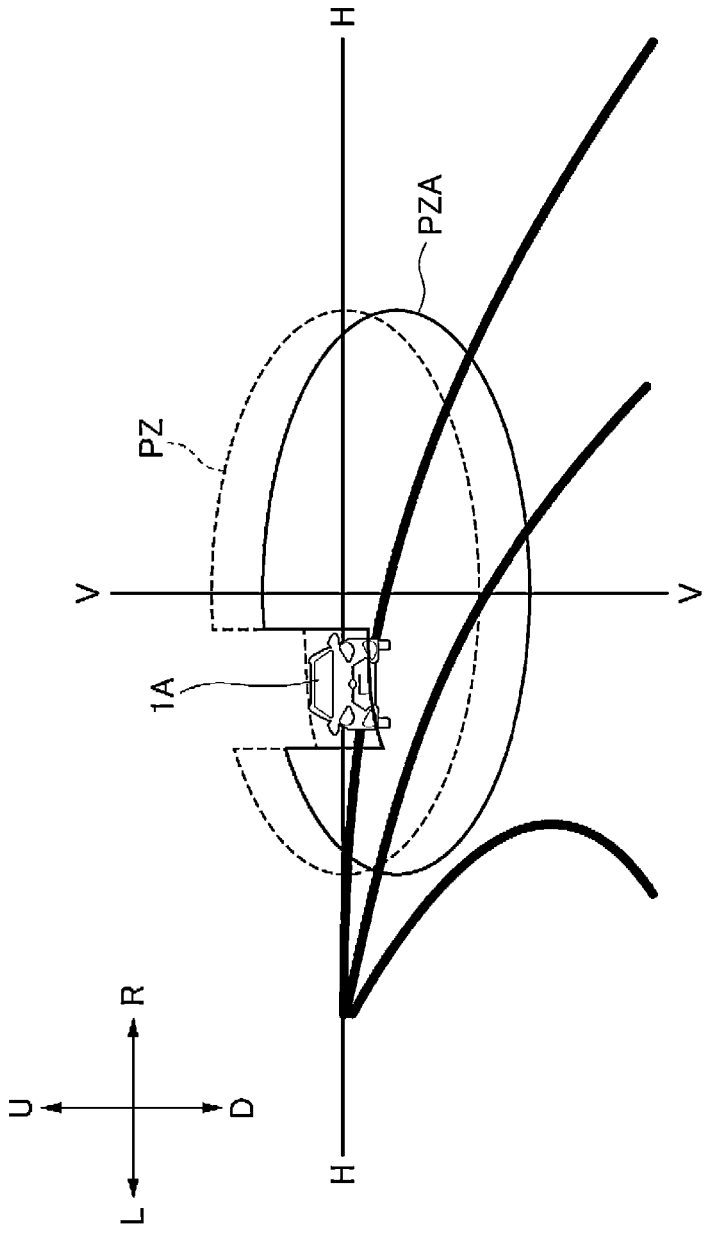
FIG. 4 is a diagram illustrating a low beam light distribution pattern and an ADB light distribution pattern emitted by a right lamp unit in the first example.

Next, light distribution patterns PZ and PZA emitted in this example will be described with reference to FIGS. 3 and 4. FIG. 3 is a flowchart illustrating a first example performed in this example. FIG. 4 is a diagram illustrating light distribution patterns PZ and PZA, including a low beam light distribution pattern and an ADB light distribution pattern, emitted by the right lamp unit 60 in the first example. In this example, the right optical unit 61 emits not only a low beam light distribution pattern but also an ADB light distribution pattern. The light distribution patterns PZ and PZA include a low beam light distribution pattern and an ADB light distribution pattern. Since light distribution patterns emitted by the left lamp unit 70 are the same as the light distribution patterns PZ and PZA emitted by the right lamp unit 60, the following description will focus on a case where the right lamp unit 60 emits the light distribution patterns PZ and PZA, and the description of the left lamp unit 70 will be omitted. Further, FIG. 4 illustrates the V-V line indicating the vertical direction (up-down direction in FIG. 4) at the emission range center of the right lamp unit 60 and the H-H line perpendicular to the V-V line and extending in the horizontal direction (left-right direction in FIG. 4). The V-V line represents an example of the left-right direction center in front of the vehicle 1.

In this example, a case where the vehicle 1 is traveling in the left lane on a level road with no gradient will be described. The first emission direction of the right lamp unit 60 in the initial state is the first reference direction. In this example, the height of the first reference direction is aligned with the H-H line. FIG. 4 illustrates the light distribution pattern PZ formed when light is emitted from the right lamp unit 60 to the first reference direction, as drawn by a dashed line. Further, in this example, FIG. 4 illustrates the light distribution pattern PZA when the first emission direction of the right lamp unit 60 is lowered from the reference direction, as drawn by a solid line. The light distribution patterns PZ and PZA illustrated in FIG. 4 are projections on a virtual vertical screen at a predetermined position in front of the vehicle 1 (e.g., position 25 meters ahead of the vehicle 1).

As illustrated in FIG. 3, the camera 20 captures images of a forward area of the vehicle 1 and acquires imaging data related to the forward area (STEP110). The camera 20 may capture images of the forward area of the vehicle 1 at predetermined intervals. The camera 20 transmits the imaging data to the vehicle control unit 40 (STEP120).

The vehicle control unit 40 analyzes the imaging data to determine whether an oncoming vehicle 1A is present (STEP130). When the vehicle control unit 40 determines that the oncoming vehicle 1A is not present (NO in STEP130), the vehicle control unit 40 returns the process to STEP110. When the vehicle control unit 40 determines that the oncoming vehicle 1A is present (YES in STEP130), the vehicle control unit 40 generates position information for the oncoming vehicle 1A from the imaging data (STEP140). The position information for the oncoming vehicle 1A is, for example, an angular coordinate indicating the azimuth of the oncoming vehicle 1A as seen from the vehicle 1. The vehicle control unit 40 transmits the position information for the oncoming vehicle 1A to the lamp control unit 50 (STEP150).

When receiving the position information for the oncoming vehicle 1A, the lamp control unit 50 performs parallax correction on the position information (STEP160). As illustrated in FIG. 1, since the installation position of the right lamp unit 60 in the vehicle 1 is different from the installation position of the camera 20, there is a misalignment (parallax) between the emission direction of the right lamp unit 60 (i.e., first emission direction) and the imaging direction of the camera 20. Therefore, the position of the oncoming vehicle 1A generated from the imaging data of the camera 20 corresponds to the position indicated in the imaging direction of the camera 20 and is different from the position in the emission direction of the right lamp unit 160. The lamp control unit 50 performs parallax correction on the position information for the oncoming vehicle 1A received from the vehicle control unit 40, thereby generating first position information parallax-corrected on the first emission direction.

Further, the vehicle control unit 40 determines whether the vehicle 1 is turning or not (STEP170). The vehicle control unit 40 may receive a signal from the steering device 30, indicating that the steering device 30 has been operated, and when such a signal is received, may determine that the vehicle 1 is turning. For example, the vehicle control unit 40 may analyze the imaging data received from the camera 20 to determine whether the lane that the vehicle 1 is traveling in curves in front of the vehicle 1. The vehicle control unit 40 may determine whether the lane that the vehicle 1 is traveling in curves based on position information of the vehicle 1 from a GPS (not illustrated) or a storage (not illustrated) and map information. In any case, when the vehicle control unit 40 determines that the vehicle 1 is traveling within a predetermined turning radius, the vehicle control unit 40 will determine that the vehicle 1 is turning. When the vehicle control unit 40 determines that the vehicle 100 is turning (YES in STEP170), the vehicle control unit 40 transmits a signal indicating this to the lamp control unit 50 to proceed with the process. When the vehicle control unit 40 determines that the vehicle 1 is not turning (NO in STEP170), the vehicle control unit 40 returns the process to STEP110.

When receiving a signal indicating the position information for the oncoming vehicle 1A and a signal indicating that the vehicle 1 is turning from the vehicle control unit 40, the lamp control unit 50 generates a control signal to lower the first emission direction of the light distribution pattern PZ of the right lamp unit 60 (STEP180). The control signal includes information indicating the first movement amount of the first emission direction. The control signal may change the first movement amount based on the position information for the oncoming vehicle 1A. For example, the lamp control unit 50 generates a control signal to lower the first emission direction of the light distribution pattern PZ downward by 2 degrees from the first reference direction. In this case, the first movement amount is −2 degrees. After that, the lamp control unit 50 transmits the generated control signal to the right drive unit 62.

When receiving the control signal, the right drive unit 62 operates to lower the first emission direction of the light distribution pattern PZ of the right lamp unit 60 (STEP190). For example, the right drive unit 62 displaces the orientation of the right optical unit 61 downward by 2 degrees, thereby lowering the first emission direction of the light distribution pattern PZ emitted by the right optical unit 61. As a result, the light distribution pattern PZA is emitted from the right optical unit 61.

After that, the vehicle control unit 40 determines whether the vehicle 1 has completed the turn (STEP200). When the vehicle control unit 40 determines that the vehicle 1 is not done turning (NO in STEP200), the vehicle control unit 40 returns the process to before STEP200. When the vehicle control unit 40 determines that the vehicle 1 has completed the turn (YES in STEP200), the vehicle control unit 40 transmits a signal indicating this to the lamp control unit 50. The lamp control unit 50, upon receiving the signal, drives the right drive unit 62 to return the first emission direction of the light distribution pattern PZA of the right lamp unit 60 to the first reference direction (STEP210). For example, the right drive unit 62 displaces the orientation of the right optical unit 61 upward by 2 degrees, thereby returning the first emission direction of the light distribution pattern PZA emitted by the right optical unit 61 to the first reference direction. As a result, the light distribution pattern PZ is emitted from the right optical unit 61. After that, the lamp control unit 50 returns the process to STEP110.

In general, in a low beam light distribution pattern, the cutoff line of light primarily emitted to the opposing lane is lower than the cutoff line of light primarily emitted to the vehicle own lane. Thus, when the vehicle 1 is traveling straight, glare to the occupant of the oncoming vehicle 1A traveling in the opposing lane is prevented, and light is emitted over a wide range of the vehicle own lane to ensure long-distance visibility. However, when the vehicle 1 is turning, the light emitted to the vehicle own lane may also be directed to the opposing lane. For example, as illustrated in FIG. 4, when the vehicle 1 is turning and the oncoming vehicle 1A is present in front of the vehicle 1, the low beam light distribution pattern emitted by the right lamp unit 60 to the first reference direction may result in the light emitted to the vehicle own lane in the low beam light distribution pattern also fully encompassing the oncoming vehicle 1A, which may cause glare to the occupant of the oncoming vehicle 1A.

According to the vehicle lamp 10 of the present embodiment, when the vehicle 1 is turning and the oncoming vehicle 1A is present in front of the vehicle 1, the light distribution pattern PZA including the low beam light distribution pattern of the right lamp unit 60 is lowered toward the first emission direction positioned below the first reference direction. Therefore, the cutoff line of the low beam light distribution pattern is lowered compared to the cutoff line of the low beam light distribution pattern in the initial state. Thus, even when the light emitted to the vehicle own lane may also be directed to the opposing lane, the overall lowering of the cutoff line of the low beam light distribution pattern may further reduce glare to the occupant of the oncoming vehicle 1A.

The vehicle lamp 10 of the present embodiment includes the right drive unit 62 that displaces the right optical unit 61 in the up-down direction, thus allowing the emission direction of the light distribution pattern PZA, including the low beam light distribution pattern, emitted by the right optical unit 61 to be displaced in the up-down direction.

The vehicle lamp 10 of the present embodiment includes the right drive unit 62 that displaces the emission direction of the light distribution pattern PZA, including the low beam light distribution pattern, emitted by the right optical unit 61 in the up-down direction, but the configuration of the vehicle lamp 10 is not limited to this. Instead of the right drive unit 62, the right optical unit 61 of the vehicle lamp 10 may be constituted with at least one light source and an optical system including a drive mirror. In this case, the emission direction may be lowered by displacing the emission position of the entire light distribution pattern downward through the control of the drive mirror without changing the orientation of the entire optical unit.

In this example, the vehicle control unit 40 performed image analysis on the imaging data from the camera 20 or received a signal from the steering device 30, but the lamp control unit 50 may also perform image analysis or receive a signal from the steering device 30 directly or indirectly.

In this example, the vehicle control unit 40 determined whether the vehicle 1 was turning (STEP170) after the lamp control unit 50 performed parallax correction on the position information for the oncoming vehicle 1A (STEP160), but the order of processes is not limited to this. For example, the vehicle control unit 40 may determine whether the vehicle 1 is turning before determining whether the oncoming vehicle 1A is present (before STEP130). For example, the vehicle control unit 40 may determine whether the vehicle 1 is turning while the lamp control unit 50 is generating the position information for the oncoming vehicle 1A and performing parallax correction on the position information (STEP140 to STEP160).

This example has been described that the height of the first reference direction of the right lamp unit 60 in the initial state is aligned with the H-H line illustrated in FIG. 4, but the height of the first reference direction is not necessarily aligned with the H-H line. For example, when the vehicle 1 is loaded with, e.g., heavy cargo in the rear, the first reference direction of the right lamp unit 60 may be 1 degree higher than the H-H line. In such a case, the first reference direction is +1 degree relative to the H-H line. The vehicle lamp 10 under such a condition may lower the first emission direction of the light distribution pattern PZ, including the low beam light distribution pattern, from +1 degree to 0 degrees, based on the presence or absence of the oncoming vehicle 1A or whether the vehicle 1 is turning.

Figure 5:
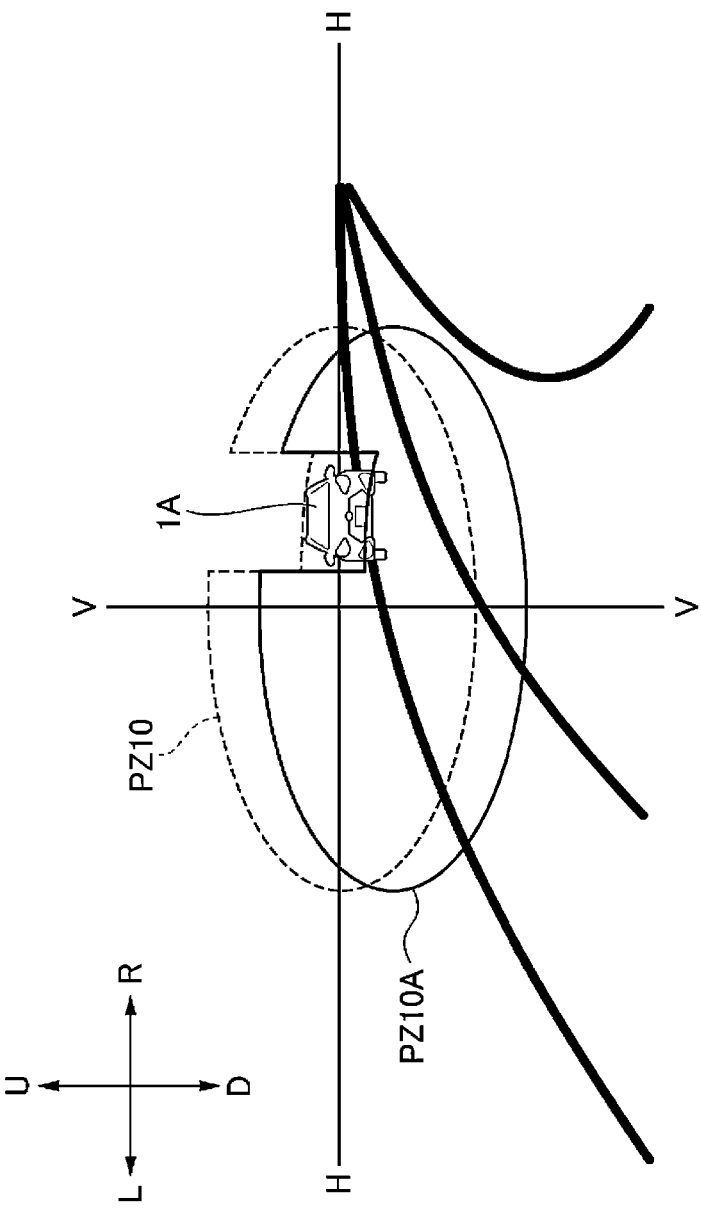
FIG. 5 is a diagram illustrating a low beam light distribution pattern and an ADB light distribution pattern emitted by the right lamp unit when a vehicle is traveling in the right lane.

This example has described the case where the vehicle 1 is traveling in the left lane, but the same effect may be achieved even when the vehicle 1 is traveling in the right lane. FIG. 5 is a diagram illustrating light distribution patterns PZ10 and PZ10A, including a low beam light distribution pattern and an ADB light distribution pattern, emitted by the right lamp unit 60 when the vehicle 1 is traveling in the right lane. As illustrated in FIG. 5, when the vehicle 1 is turning and the oncoming vehicle 1A is present in front of the vehicle 1, the light distribution pattern PZ10 emitted from the right lamp unit 60 to the first reference direction may cause glare to the occupant of the oncoming vehicle 1A. However, according to the vehicle lamp 10 of the present embodiment, even when the vehicle 1 is traveling in the right lane, the light distribution pattern PZ10A of the right lamp unit 60 is emitted to the first emission direction, which is lower than the first reference direction. Therefore, the cutoff line of the low beam light distribution pattern may be uniformly lowered, thereby allowing glare to the occupant of the oncoming vehicle 1A to be further reduced.

Figure 6:
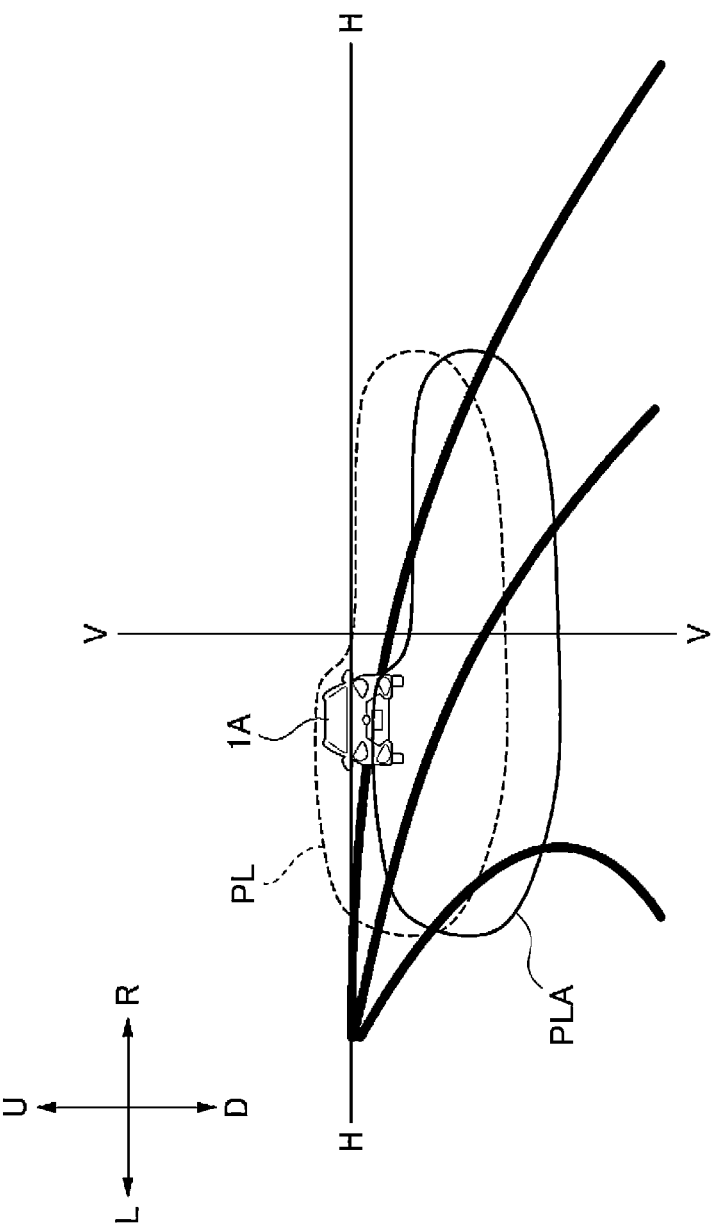
FIG. 6 is a diagram illustrating low beam light distribution patterns emitted by the right lamp unit in the first example.

This example has described the case where the right lamp unit 60 emits the light distribution patterns PZ and PZA including the low beam light distribution pattern and the ADB light distribution pattern, but the same effect is achieved even when the right lamp unit 60 emits only the low beam light distribution pattern. FIG. 6 is a diagram illustrating a low beam light distribution pattern PL emitted by the right lamp unit 60 when the vehicle 1 is traveling in the left lane. FIG. 6 illustrates the light distribution pattern PL formed when light is emitted from the right lamp unit 60 to the first reference direction in the initial state, as drawn by a dashed line. Furthermore, FIG. 6 illustrates a low beam light distribution pattern PLA when the first emission direction of the right lamp unit 60 is lowered from the reference direction, as drawn by a solid line. As illustrated in FIG. 6, in the initial state, the low beam light distribution pattern PL may cause glare to the occupant of the oncoming vehicle 1A. However, according to the vehicle lamp 10 of the present embodiment, when the vehicle 1 is turning and the oncoming vehicle 1A is present in front of the vehicle 1, the low beam light distribution pattern PLA is emitted to the first emission direction, which is lower than the first reference direction. Therefore, the cutoff line of the low beam light distribution pattern PLA is uniformly lowered, thereby allowing glare to the occupant of the oncoming vehicle 1A to be further reduced.

Figure 7:
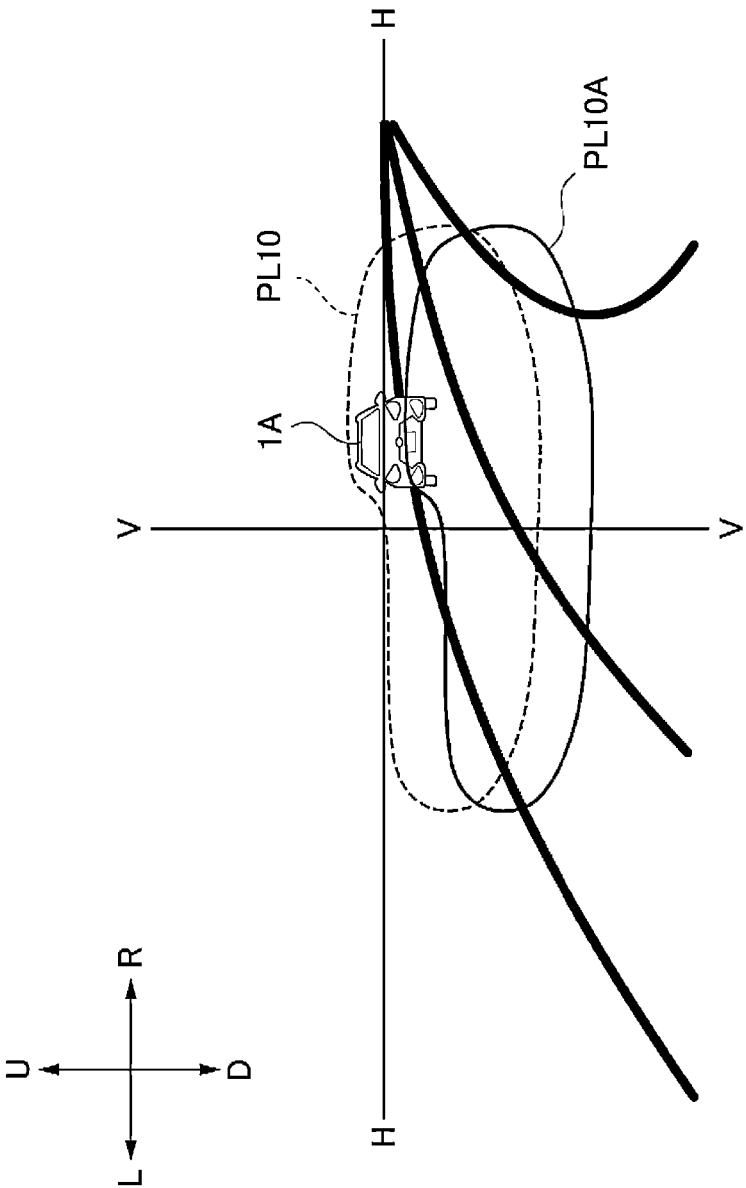
FIG. 7 is a diagram illustrating low beam light distribution patterns emitted by the right lamp unit when a vehicle is traveling in the right lane.

Even when the right lamp unit 60 emits only the low beam light distribution pattern, the same effect is achieved when the vehicle 1 is traveling in the right lane. FIG. 7 is a diagram illustrating a low beam light distribution pattern PL10 emitted by the right lamp unit 60 when the vehicle 1 is traveling in the right lane. FIG. 7 illustrates the low beam light distribution pattern PL10 formed when light is emitted from the right lamp unit 60 to the first reference direction in the initial state, as drawn by a dashed line. Further, FIG. 7 illustrates a low beam light distribution pattern PL10A when the first emission direction of the right lamp unit 60 is lowered from the reference direction, as drawn by a solid line. As illustrated in FIG. 7, according to the vehicle lamp 10 of the present embodiment, when the vehicle 1 is turning and the oncoming vehicle 1A is present in front of the vehicle 1, the low beam light distribution pattern PL10A is emitted to the first emission direction, which is lower than the first reference direction. Therefore, the cutoff line of the low beam light distribution pattern PL10A is uniformly lowered, thereby allowing glare to the occupant of the oncoming vehicle 1A to be further reduced.

In this example, the lamp control unit 50 is provided in the vehicle lamp 10, but the lamp control unit 50 may be provided in the vehicle 1 instead of the vehicle lamp 10. In other words, the lamp control unit 50 may be integrated into the vehicle control unit 40.

Second Example

Figure 8:
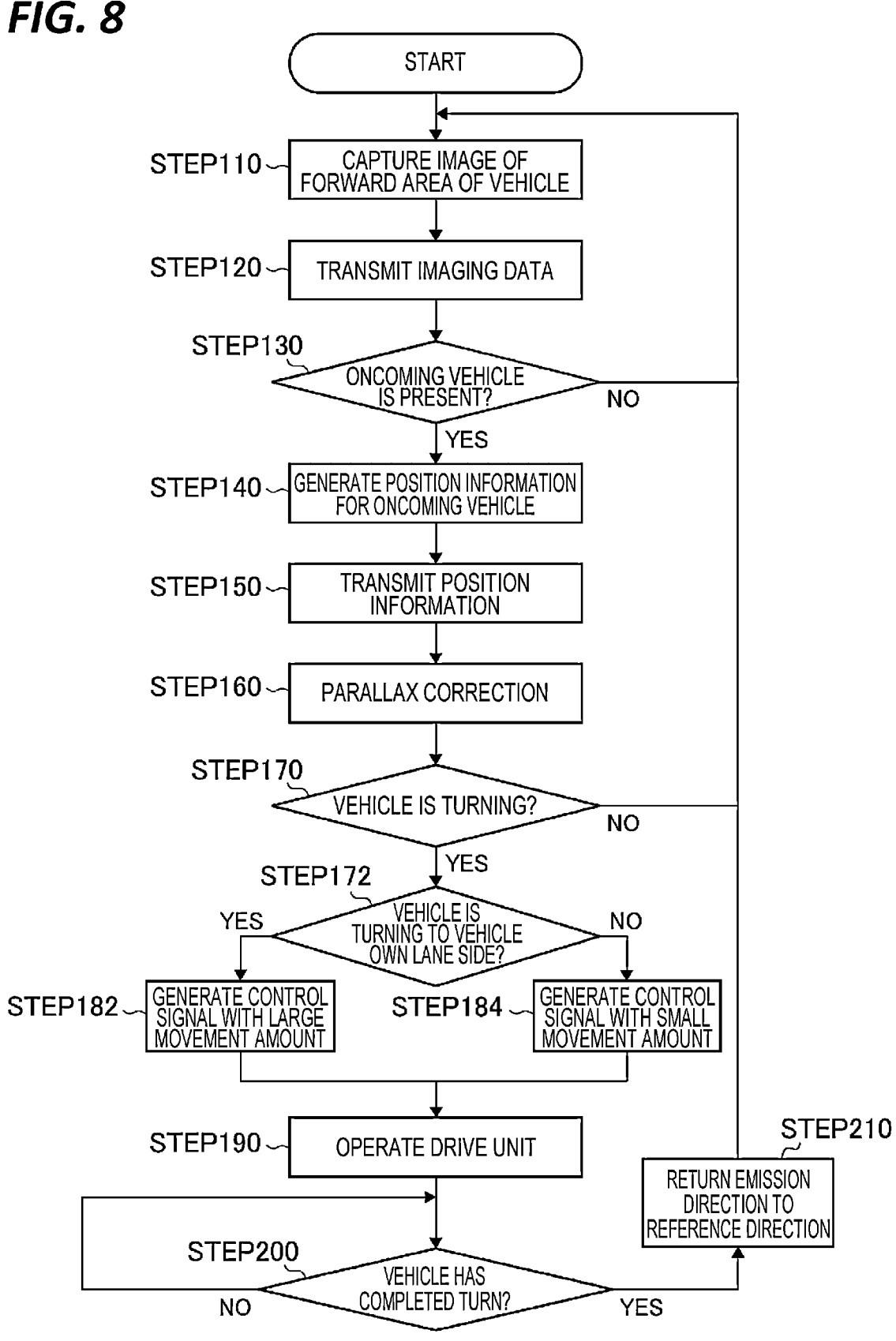
FIG. 8 is a flowchart illustrating a second example performed in the present embodiment.

Next, other processes according to the present embodiment will be described with reference to FIG. 8. FIG. 8 is a flowchart illustrating a second example performed in the present embodiment. In the processes illustrated in FIG. 8, the same processes as those illustrated in FIG. 3 are designated by the same reference numerals, and descriptions thereof will be omitted. For example, STEP110 to STEP170 illustrated in FIG. 8 are the same processes as STEP110 to STEP170 illustrated in FIG. 3, and thus, descriptions thereof will be omitted. STEP190 to STEP210 illustrated in FIG. 8 are the same processes as STEP190 to STEP210 illustrated in FIG. 3, and thus, descriptions thereof will be omitted.

As illustrated in FIG. 8, when the vehicle control unit 40 determines that the oncoming vehicle 1A is present (YES in STEP130) and determines that the vehicle 1 is turning (YES in STEP170), the vehicle control unit 40 further determines whether the vehicle 1 is turning to the vehicle own lane side (STEP172). For example, in this example, the vehicle 1 is traveling in the left lane and the vehicle control unit 40 determines whether the vehicle 1 is turning to the left. For example, when the steering device 30 is operated to the left, the steering device 30 transmits a signal indicating this to the vehicle control unit 40. The vehicle control unit 40, upon receiving the signal, determines that the vehicle 1 is turning to the left based on the signal. The vehicle control unit 40 may also determine that the vehicle 1 is turning to the left based on image analysis or position information for the vehicle 1 from the GPS. The "left" is an example of the vehicle own lane side.

When the vehicle control unit 40 determines that the vehicle 1 is turning to the vehicle own lane side (YES in STEP172), the vehicle control unit 40 transmits a signal indicating this to the lamp control unit 50. The lamp control unit 50, upon receiving the signal, generates a control signal to relatively significantly lower the first emission direction of the light distribution pattern PZ, in other words, a control signal with a large first movement amount (STEP182). For example, the lamp control unit 50 generates a control signal to lower the first emission direction of the light distribution pattern PZ downward by 2 degrees from the first reference direction. In this case, the first movement amount is −2 degrees. After that, the lamp control unit 50 transmits the generated control signal to the right drive unit 62 and proceeds the process to after STEP190.

When the vehicle control unit 40 determines that the vehicle 1 is not done turning to the vehicle own lane side (NO in STEP172), the vehicle control unit 40 transmits a signal indicating this to the lamp control unit 50. For example, the vehicle 1 is traveling in the left lane and the vehicle control unit 40 determines that the vehicle 1 is turning to the right. In this case, upon receiving the signal, the lamp control unit 50 generates a control signal to relatively slightly lower the first emission direction of the light distribution pattern PZ, in other words, a control signal with a small first movement amount (STEP184). For example, the lamp control unit 50 generates a control signal to lower the first emission direction of the light distribution pattern PZ downward by 1 degree from the first reference direction. In this case, the first movement amount is −1 degree. After that, the lamp control unit 50 transmits the generated control signal to the right drive unit 62 and proceeds the process to after STEP190.

In this way, the lamp control unit 50 of this example generates a control signal such that the first movement amount (−2 degrees) when the vehicle 1 is turning to the vehicle own lane side is larger than the first movement amount (−1 degree) when the vehicle 1 is turning to the opposing lane side. The magnitude of the first movement amount refers to the absolute value of the first movement amount.

As illustrated in FIG. 6, in the low beam light distribution pattern PL, the cutoff line of light primarily emitted to the vehicle own lane is generally higher than the cutoff line of light primarily emitted to the opposing lane. Thus, when the vehicle 1 is turning to the vehicle own lane side, the light emitted to the vehicle own lane may be directed over a wide range of the opposing lane, causing glare to the occupant of the oncoming vehicle 1A. However, as a result of determining the magnitude of the first movement amount based on the turning direction of the vehicle 1, the vehicle lamp 10 of this example may prevent glare to the occupant of the oncoming vehicle 1A while minimizing the magnitude of the first movement amount of the emission direction to ensure long distance visibility.

When the vehicle 1 is traveling in the right lane, the vehicle own lane is on the right and the opposing lane is on the left. Even in this case, the same effect as described above may be achieved according to this example.

In this example, "when the steering device 30 is operated" includes not only a case where the steering device 30 is operated while the vehicle 1 is traveling in manual driving mode and, but also a case where the steering device 30 is operated while the vehicle 1 is traveling in automatic driving mode.

Third Example

Figure 9:
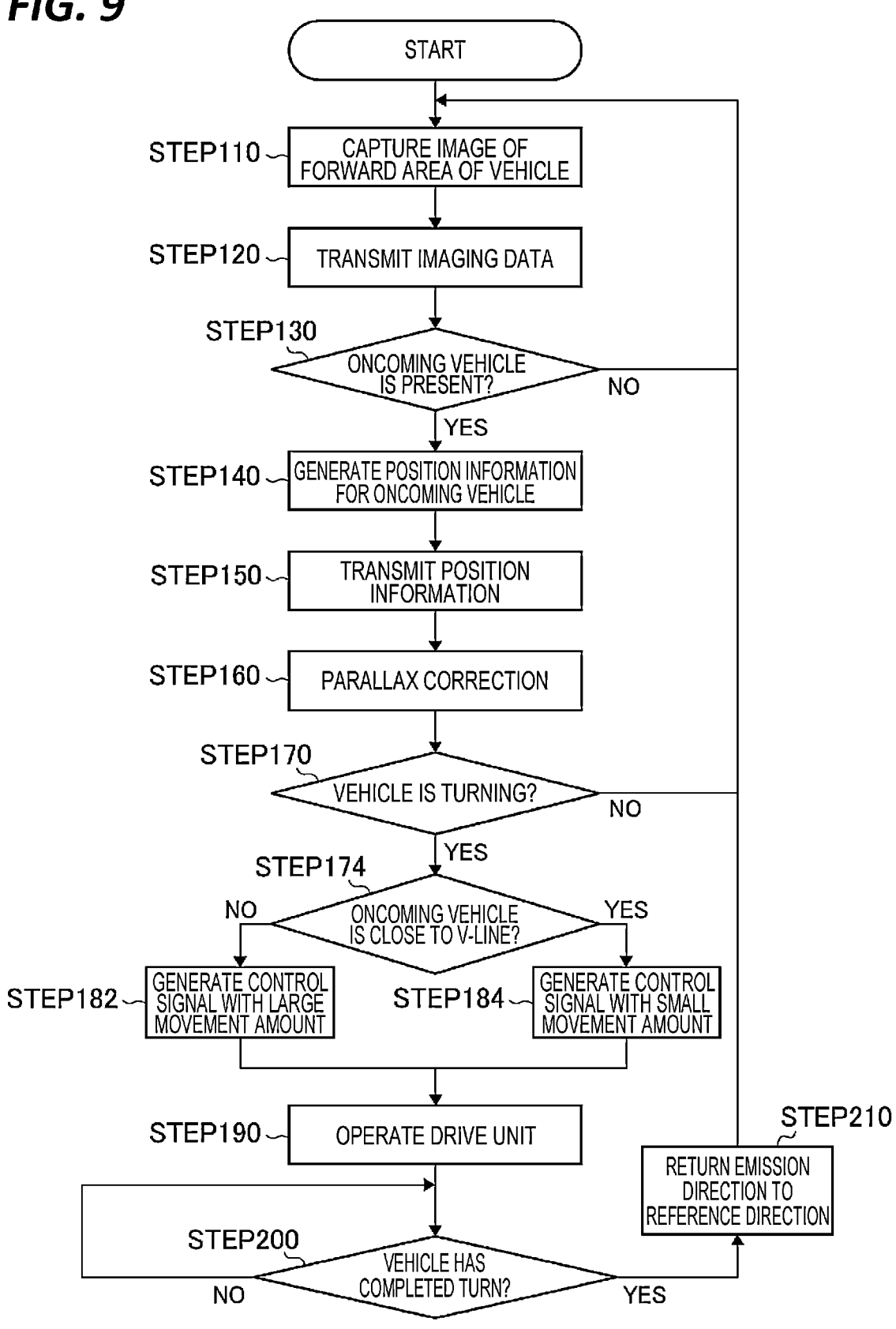
FIG. 9 is a flowchart illustrating a third example performed in the present embodiment.

Next, other processes according to the present embodiment will be described with reference to FIG. 9. FIG. 9 is a flowchart illustrating a third example performed in the present embodiment. In the processes illustrated in FIG. 9, the same processes as those illustrated in FIG. 3 are designated by the same reference numerals, and descriptions thereof will be omitted. For example, STEP110 to STEP170 illustrated in FIG. 9 are the same processes as STEP110 to STEP170 illustrated in FIG. 3, and thus, descriptions thereof will be omitted. STEP190 to STEP210 illustrated in FIG. 9 are the same processes as STEP190 to STEP210 illustrated in FIG. 3, and thus, descriptions thereof will be omitted.

As illustrated in FIG. 9, when the vehicle control unit 40 determines that the oncoming vehicle 1A is present (YES in STEP130) and determines that the vehicle 1 is turning (YES in STEP170), the vehicle control unit 40 further determines whether the position of the oncoming vehicle 1A is close to the V-V line (left-right direction center in front of the vehicle 1) (STEP174). For example, the vehicle control unit 40 determines whether a coordinate indicated by the first position information for the oncoming vehicle 1A, after parallax correction, is within a first threshold range in the left-right direction centered around the V-V line, as illustrated in FIG. 4 or 5. When the vehicle control unit 40 determines that the position of the oncoming vehicle 1A is within the first threshold range (YES in STEP174), the vehicle control unit 40 transmits a signal indicating this to the lamp control unit 50. The lamp control unit 50, upon receiving the signal, generates a control signal with a small first movement amount (STEP184). For example, the lamp control unit 50 generates a control signal to lower the first emission direction of the light distribution pattern PZ downward by 1 degree from the first reference direction. After that, the lamp control unit 50 transmits the generated control signal to the right drive unit 62 and proceeds the process to after STEP190.

When the vehicle control unit 40 determines that the position of the oncoming vehicle 1A is not within the first threshold range (NO in STEP174), the vehicle control unit 40 transmits a signal indicating this to the lamp control unit 50. In this case, upon receiving the signal, the lamp control unit 50 generates a control signal with a large first movement amount (STEP182). For example, the lamp control unit 50 generates a control signal to lower the first emission direction of the light distribution pattern PZ downward by 2 degrees from the first reference direction. After that, the lamp control unit 50 transmits the generated control signal to the right drive unit 62 and proceeds the process to after STEP190.

In this way, the lamp control unit 50 of this example generates a control signal such that the first movement amount (−1 degree) when the position of the oncoming vehicle 1A is within the first threshold range and is close to the V-V line (left-right direction center in front of the vehicle) is smaller than the first movement amount (−2 degrees) when the position of the oncoming vehicle 1A is not within the first threshold range and is farther from the V-V line (left-right direction center in front of the vehicle).

As illustrated in FIG. 6, in the low beam light distribution pattern PL, the cutoff line of light emitted to the vicinity of the V-V line is generally lower than the cutoff line of light primarily emitted to the vehicle own lane. In particular, when the vehicle 1 is turning to the vehicle own lane side (left in FIG. 6) and the oncoming vehicle 1A is farther from the V-V line, it may cause glare to the occupant of the oncoming vehicle 1A compared to when the oncoming vehicle 1A is close to the V-V line. However, as a result of determining the magnitude of the first movement amount based on the position of the oncoming vehicle 1A, the vehicle lamp 10 of this example may prevent glare to the occupant of the oncoming vehicle 1A while minimizing the first movement amount of the first emission direction to ensure long distance visibility.

Fourth Example

Next, other processes according to the present embodiment will be described with reference to FIGS. 2 and 10. In a fourth example, the vehicle lamp 10 performs processes using a speed sensor 80 configured to detect the speed of the vehicle 1 (FIG. 2). The speed sensor 80 is configured to transmit a signal indicating the speed of the vehicle 1 to the lamp control unit 50 via the vehicle control unit 40.

Figure 10:
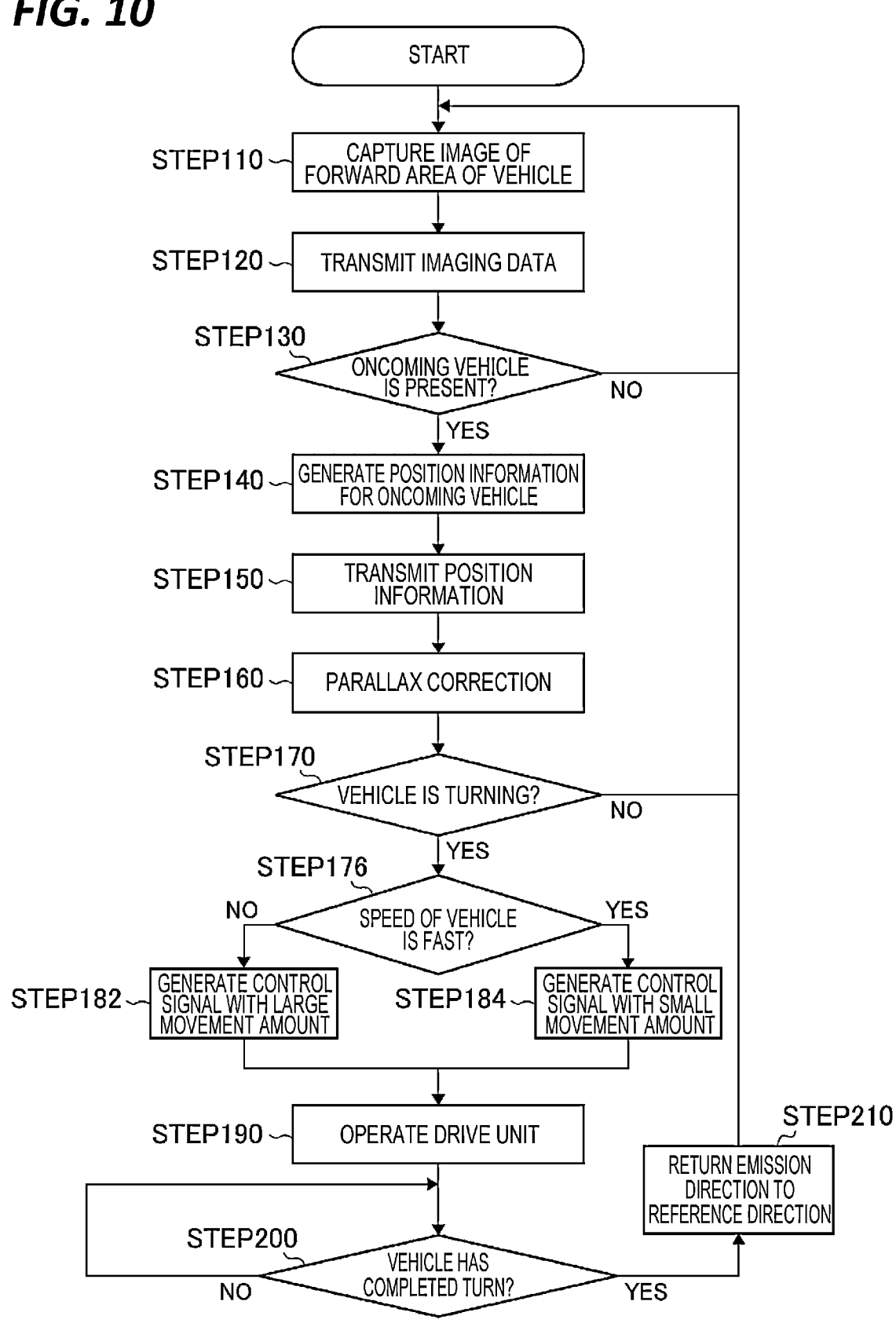
FIG. 10 is a flowchart illustrating a fourth example performed in the present embodiment.

FIG. 10 is a flowchart illustrating a fourth example performed in the present embodiment. In the processes illustrated in FIG. 10, the same processes as those illustrated in FIGS. 3, 8 and 9 are designated by the same reference numerals, and descriptions thereof will be omitted. For example, STEP110 to STEP170 illustrated in FIG. 10 are the same processes as STEP110 to STEP170 illustrated in FIG. 3, and thus, descriptions thereof will be omitted. STEP190 to STEP210 illustrated in FIG. 10 are the same processes as STEP190 to STEP210 illustrated in FIG. 3, and thus, descriptions thereof will be omitted.

As illustrated in FIG. 10, when the vehicle control unit 40 determines that the oncoming vehicle 1A is present (YES in STEP130) and determines that the vehicle 1 is turning (YES in STEP170), the vehicle control unit 40 further determines whether the speed of the vehicle 1 is fast or not (STEP176). For example, the vehicle control unit 40 determines whether the speed of vehicle 1, received from the speed sensor 80, is equal to or higher than a second threshold. The second threshold is, for example, 80 km/h. When the speed of the vehicle 1 is equal to or higher than the second threshold and the vehicle control unit 40 determines that the vehicle 1 is traveling at a high speed (YES in STEP176), the vehicle control unit 40 transmits a signal indicating this to the lamp control unit 50. The lamp control unit 50, upon receiving the signal, generates a control signal with a small first movement amount (STEP184). For example, the lamp control unit 50 lowers the first emission direction of the light distribution pattern PZ downward by 1 degree from the first reference direction. After that, the lamp control unit 50 transmits the generated control signal to the right drive unit 62 and proceeds the process to after STEP190.

When the speed of the vehicle 1 is less than the second threshold and the vehicle control unit 40 determines that the vehicle 1 is traveling at a low speed (NO in STEP176), the vehicle control unit 40 transmits a signal indicating this to the lamp control unit 50. In this case, upon receiving the signal, the lamp control unit 50 generates a control signal with a large first movement amount (STEP182). For example, the lamp control unit 50 generates a control signal to lower the first emission direction of the light distribution pattern PZ downward by 2 degrees from the first reference direction. After that, the lamp control unit 50 transmits the generated control signal to the right drive unit 62 and proceeds the process to after STEP190.

In this way, the lamp control unit 50 of this example generates a control signal such that the first movement amount (−1 degree) during high-speed traveling is smaller than the first movement amount (−2 degrees) during low-speed traveling.

When the vehicle 1 is turning during high-speed traveling, the turning angle of the vehicle 1 tends to be smaller compared to that during low-speed traveling, which results in a smaller change in the emission range of light that may be emitted to the opposing lane. In this case, the likelihood of glare to the occupant of the oncoming vehicle 1A is relatively low. Meanwhile, when the vehicle 1 is turning during low-speed traveling, the turning angle of the vehicle 1 tends to be greater compared to that during high-speed traveling, which results in a greater change in the emission range of light that may be emitted to the opposing lane. In this case, the likelihood of glare to the occupant of the oncoming vehicle 1A is relatively high. The vehicle lamp 10 of this example may prevent glare to the occupant of the oncoming vehicle 1A while minimizing the first movement amount of the first emission direction to ensure long distance visibility, as a result of determining the magnitude of the first movement amount based on the speed of the vehicle 1.

As described above, this specification discloses the following.

(1) A vehicle lamp including:

an optical unit including a light source configured to emit at least a low beam light distribution pattern; and a lamp controller configured to control the optical unit, wherein when a vehicle mounted with the vehicle lamp is turning and an oncoming vehicle is present in front of the vehicle, the lamp controller controls the optical unit to lower an emission direction of the low beam light distribution pattern.

(2) The vehicle lamp described in (1), further including a drive unit including a motor configured to displace the optical unit in a vertical direction, wherein the lamp controller lowers the emission direction of the low beam light distribution pattern by controlling the drive unit.

(3) The vehicle lamp described in (1) or (2), wherein the lamp controller controls the optical unit such that a displacement amount of the emission direction during high-speed traveling of the vehicle is smaller than the displacement amount of the emission direction during low-speed traveling of the vehicle.

(4) The vehicle lamp described in any one of (1) to (3), wherein the lamp controller controls the optical unit such that the displacement amount of the emission direction when a position of the oncoming vehicle is close to a horizontal direction center in front of the vehicle is smaller than the displacement amount of the emission direction when the position of the oncoming vehicle is farther from the center.

(5) The vehicle lamp described in any one of (1) to (4), wherein the lamp controller controls the optical unit such that the displacement amount of the emission direction when the vehicle is turning to a vehicle own lane side is larger than the displacement amount of the emission direction when the vehicle is turning to an opposing lane side.

(6) The vehicle lamp described in (5), wherein the lamp controller controls the optical unit such that the displacement amount of the emission direction when a steering device is operated to the vehicle own lane side is larger than the displacement amount of the emission direction when the steering device is operated to the opposing lane side.

From the foregoing, it will be understood that various examples of the present disclosure are described for illustrative purposes, and that various variations may be made without departing from the scope and idea of the present disclosure. Therefore, the various examples disclosed herein are not intended to limit the essential scope and ideas designated by each of the following claims.

What is claimed is:

1. A vehicle lamp comprising:

an optical unit including a light source configured to emit at least a low beam light distribution pattern; and a lamp controller configured to control the optical unit, wherein the lamp controller is configured to determine whether an oncoming vehicle is present in front of the vehicle, wherein the lamp controller is configured to generate position information of the oncoming vehicle when the oncoming vehicle is determined to be present, and wherein when a vehicle mounted with the vehicle lamp is turning and the oncoming vehicle is determined to be present, the lamp controller controls the optical unit to lower an emission direction of the low beam light distribution pattern based on the position information of the oncoming vehicle.

2. The vehicle lamp according to claim 1, further comprising:

a drive unit including a motor configured to displace the optical unit in a vertical direction, wherein the lamp controller lowers the emission direction of the low beam light distribution pattern by controlling the drive unit.

3. The vehicle lamp according to claim 1, wherein the lamp controller controls the optical unit such that a displacement amount of the emission direction during high-speed traveling of the vehicle is smaller than the displacement amount of the emission direction during low-speed traveling of the vehicle.

4. The vehicle lamp according to claim 1, wherein the lamp controller controls the optical unit such that the displacement amount of the emission direction when a position of the oncoming vehicle is close to a horizonal direction center in front of the vehicle is smaller than the displacement amount of the emission direction when the position of the oncoming vehicle is farther from the center.

5. The vehicle lamp according to claim 1, wherein the lamp controller controls the optical unit such that a displacement amount of the emission direction when the vehicle is turning to a vehicle own lane side is larger than the displacement amount of the emission direction when the vehicle is turning to an opposing lane side.

6. The vehicle lamp according to claim 5, wherein the lamp controller controls the optical unit such that the displacement amount of the emission direction when a steering device is operated to the vehicle own lane side is larger than the displacement amount of the emission direction when the steering device is operated to the opposing lane side.

7. The vehicle lamp according to claim 1, wherein the lamp controller is configured to perform a parallax correction on the position information of the oncoming vehicle to generate corrected position information corresponding to an irradiation direction of the optical unit, and to control the optical unit based on the corrected position information.

8. The vehicle lamp according to claim 1, wherein the lamp controller is configured to, upon determining that the vehicle has completed turning, control the optical unit to return the emission direction of the low beam light distribution pattern to a reference direction.

* * * * *